United States Patent [19]

Orimoto et al.

[11] 4,446,495
[45] May 1, 1984

[54] TAPE PLAYER REPEAT REPRODUCTION WITH OVERLAP

[75] Inventors: Akira Orimoto; Kazuo Kamei, both of Saitama, Japan

[73] Assignee: Pioneer Electronic Corporation, Tokyo, Japan

[21] Appl. No.: 358,777

[22] Filed: Mar. 17, 1982

[30] Foreign Application Priority Data

Mar. 18, 1981 [JP] Japan ................................. 56-39133

[51] Int. Cl.$^3$ ............................................. G11B 15/20
[52] U.S. Cl. ................................. 360/74.1; 360/72.1; 369/27
[58] Field of Search ............... 360/72.1, 74.1; 369/24, 369/25, 27, 30, 33, 41

[56] References Cited

U.S. PATENT DOCUMENTS

| | | | |
|---|---|---|---|
| 3,567,229 | 3/1971 | Ridings et al. | 360/74.1 |
| 4,210,785 | 7/1980 | Huber et al. | 369/30 |
| 4,225,890 | 9/1980 | Takenaka et al. | 360/72.1 |
| 4,232,346 | 11/1980 | Kobler | 360/74.1 |
| 4,237,497 | 12/1980 | Trevithick | 360/74.1 |
| 4,302,785 | 11/1981 | Mussatt | 360/74.1 |

FOREIGN PATENT DOCUMENTS 2626189 12/1977 Fed. Rep. of Germany ..... 360/74.1

Primary Examiner—George G. Stellar
Attorney, Agent, or Firm—Sughrue, Mion, Zinn, Macpeak, and Seas

[57] ABSTRACT

A tape recorder for use in situations where repetitive reproduction is required, such as in language teaching, is provided with an automatic repeat function. The inputs to the device include the length of tape to be repeated, the number of repetitions, and the overlap tape length between adjacent repeated tape portions, provided to allow more continuity. The functions, e.g. playback and rewinding, of the tape recorder are controlled according to the output of a tape counter and the above input parameters. The use of the invention allows for repeated reproduction without the formation of silent, e.g. blank portions on the tape between adjacent recorded portions.

11 Claims, 4 Drawing Figures

RF: REPEAT FREQUENCY
RL: REPRODUCTION LENGTH
OL: OVERLAP LENGTH
TCN: TAPE COUNT NUMBER 4,446,495

TAPE PLAYER REPEAT REPRODUCTION WITH OVERLAP

BACKGROUND OF THE INVENTION

This invention relates to a reproduction repeat control system for a tape recorder.

In the case where a tape recorder is used for the study of language, etc. or where data recorded thereon are written down, it is necessary to provide a repeat function for the tape recorder. For this purpose, a system has been employed in which silent (or signal-less) bands which last for about four seconds are formed on the magnetic tape during the recording operation, and a recorded part between the silent bands is repeatedly reproduced. However, this system is disadvantageous in that it is necessary to provide the silent bands on the tape, and the repeat reproduction is limited to one part of the tape for one operation.

SUMMARY OF THE INVENTION

Accordingly, an object of this invention is to provide a reproduction repeat control system for a tape recorder in which repeated reproduction can be carried out without the formation of silent bands on a magnetic tape.

Another object of the invention is to provide a repeating control system for a tape recorder in which reproduction is carried out with the repeated parts being automatically and successively shifted.

A further object of the invention is to provide a reproduction repeat control system for a tape recorder in which, in successively shifting the repeated parts, reproduction is effected with successive reproduced parts being partly overlapped with each other.

The foregoing objects have been satisfied by the provision of a reproduction control system according to the invention which includes a tape counter; reproduction length memory means for storing a signal corresponding to the length of a recorded part on the magnetic tape, which should be repeatedly reproduced; a reproduction frequency memory for storing a signal corresponding to a reproduction frequency; a repeat overlap length memory for storing a signal corresponding to the length of a recorded part of the magnetic tape which should be overlapped with the next recorded part of the magnetic tape to be repeatedly reproduced; means for repeatedly reproducing the part to be repeatedly reproduced, using the output of the counter and the output of the reproduction length memory in response to a repeat instruction signal; and means for using, when the repeat frequency memory coincides with the content of the repeat frequency memory, the output of the tape counter and the output of the repeat overlap length memory, to rewind the magnetic tape as much as the overlap recorded length, and where, when the magnetic tape is rewound as much as the overlap recorded length, reproduction is again carried out for the length of the next recorded part which should be repeatedly reproduced.

DETAILED DESCRIPTION OF THE PREFERRED EMBODIMENTS

Figure 1:
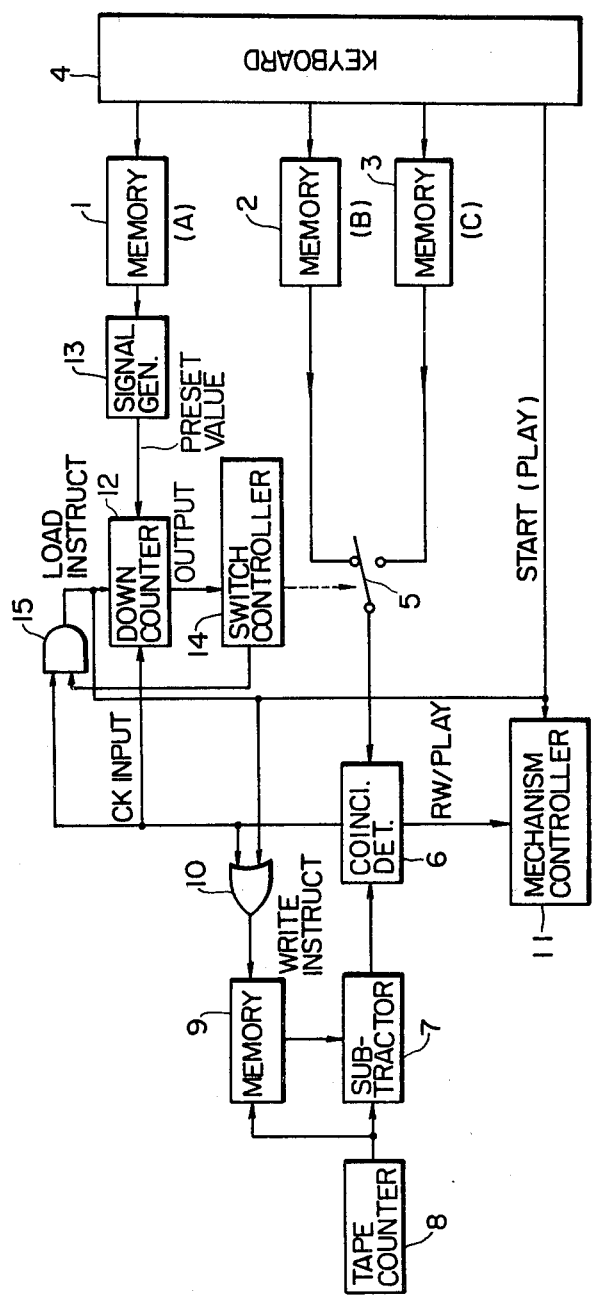
FIG. 1 is a block diagram illustrating one embodiment of this invention.

FIG. 1 is a block diagram showing a circuit according to one embodiment of the invention. Memory devices 1, 2 and 3 are provided for storing signals corresponding to a repeat frequency A, a reproduction length B and overlap length C (FIG. 2), respectively. More specifically, the memory devices 1, 2 and 3 store contents corresponding to the operation of instruction switches (not shown) on a keyboard 4, respectively. One of the outputs of the memory devices 2 and 3, which store the reproduction length and a overlap length, respectively, is selected by a select switch 5, to be applied to a coincidence detector 6, to which the subtraction output of a subtractor 7 is applied. The subtractor 7 subjects the output of a tape counter 8 and the output of a memory device 9 to subtraction. The count output of the tape counter 8 is applied to the memory device 9, and the output of an OR gate 10 is applied, as a write instruction signal, to the memory device 9. The output of the coincidence detector controls a mechanism controller 11 which operates to control the winding (RW) and playback (PLAY) modes of the tape recorder. The OR gate 10, which issues the write instruction signal, receives the output signal of the coincidence detector 6 and a repeat reproduction instruction signal (START) from the keyboard 4, and thus the count value of the tape counter 8 at the time when at least one of the two signals is produced is written in the memory device 9.

The output of the coincidence detector 6 is further applied as a count (CK) input to a presettable down-counter 12. The output of a signal generator 13, which generates a signal represented by 2A-1 with respect to the content A stored in the repeat frequency memory device 1, is applied to the preset input of the down-counter 12. the output of the counter 12 is applied to a switch controller 14 which is adapted to control the operation of the select switch 5. The outputs of the switch controller 14 and the coincidence detector 6 are applied to an AND gate 15. The preset load of the counter 12 is controlled by the output of the AND gate 15 and the start instruction signal.

Figure 2:
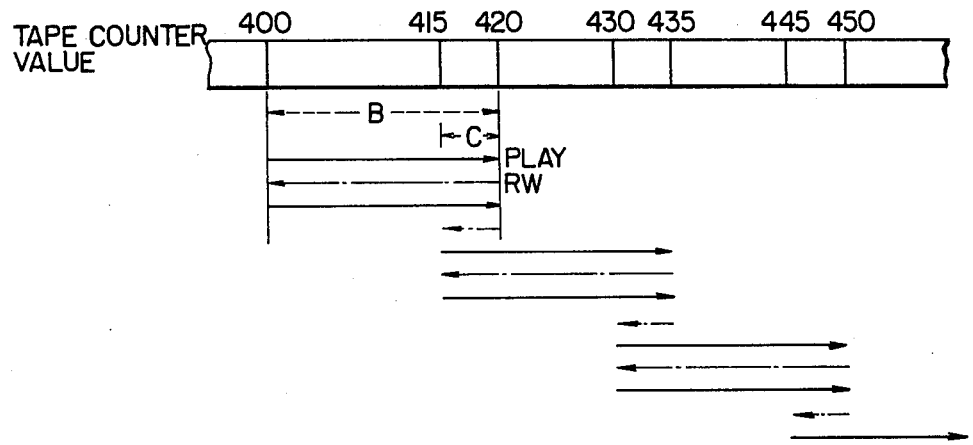
FIG. 2 is a diagram for describing the operation of the circuitry of FIG. 1.

FIG. 2 is a diagram for describing the operation of the circuit of FIG. 1. The diagram shows the case where the repeat frequency A is two (A=2), the repeat reproduction length B is twenty (B=20), the repeat overlap length C is five (C=5), and the count value of the tape counter 8 is 400 when the reproduction is started. Therefore, A=2, B=20 and C=5 are stored in the memory devices 1, 2 and 3, respectively, and the content (2A−1) of the signal generated by the preset value generator 13 for the counter 12 is three (2A−1=3).

When, under this condition, the keyboard issues the start instruction signal, the playback mode is effected by the mechanism controller 11, so that the content (400) of the tape counter at that time is written in the memory device 9 and simultaneously the value "three" (3) is preset in the down-counter 12. In the playback mode, the count value of the tape counter 8 at each time instant and the memory output (400) of the memory device 9 are subjected to subtraction in the subtractor 7. It is assumed that the switch 5 selects the output (B=20) of the repeat reproduction length memory device 2. In this case, when the subtraction (difference) output of the subtractor 7 reaches twenty (20), the coincidence output is produced by the coincidence detector 6, to control the mechanism controller 11, so that the rewinding mode is effected. As the detection output is applied as the count (CK) input to the down-counter 12, the content of the counter 12 is changed from the preset value (3) to the value (2). It should be noted that, in this case, the AND gate 15 is controlled by the output of the switch controller 14 as to be closed. Further in this case, the memory device 9 stores the count value (420) of the tape counter 8 in response to the output of the OR gate 10.

During the rewinding mode, the output of the tape counter 8 and the output (420) of the memory device 9 are subjected to subtraction in the subtractor, and when the output of the subtractor 7 reaches twenty (20), the coincidence detector 6 produces the second detection output. As a result, the content of the down-counter 12 is changed from two (2) to one (1), and simultaneously the operation mode is changed to the playback, mode again. At the same time, the content (400) of the tape counter is stored in the memory device 9 in response to the output of the OR gate 10. Thus, the same recorded part of the tape played back in the first reproduction is played back until the content of the tape counter 8 reaches 420, similarly as in the first reproduction. When the content of the tape counter 8 reaches 420, the content of the down-counter 12 becomes zero (0) for the first time. The switch controller 14 is operated by this zero output, to operate the switch 5. Therefore, the repeat overlap length (C=5) is employed as one input of the coincidence detector 6, and the operation mode is changed to the rewinding mode. At the same time, the content of the memory device 9 is rewritten as 420. Therefore, when the rewinding operation is advanced until the content of the tape counter 8 reaches 415, i.e., when the difference between the content of the memory device 9 reaches five (5), the coincidence detector 6 produces the detection output. As a result, the content of the memory device 9 is rewritten as 415, while the value (2A−1=3) is preset in the down-counter. Accordingly, the output of the switch controller 14 is inverted, so that the switch 5 selects the output (B=20) of the repeat reproduction memory device 2.

Thus, the above-described operations are carried out again beginning with the tape part which corresponds to the tape counter value (415); that is, the second repeat playback is automatically carried out in succession. Thus, the repeated reproduction is continued as shown in FIG. 2.

Figure 3:
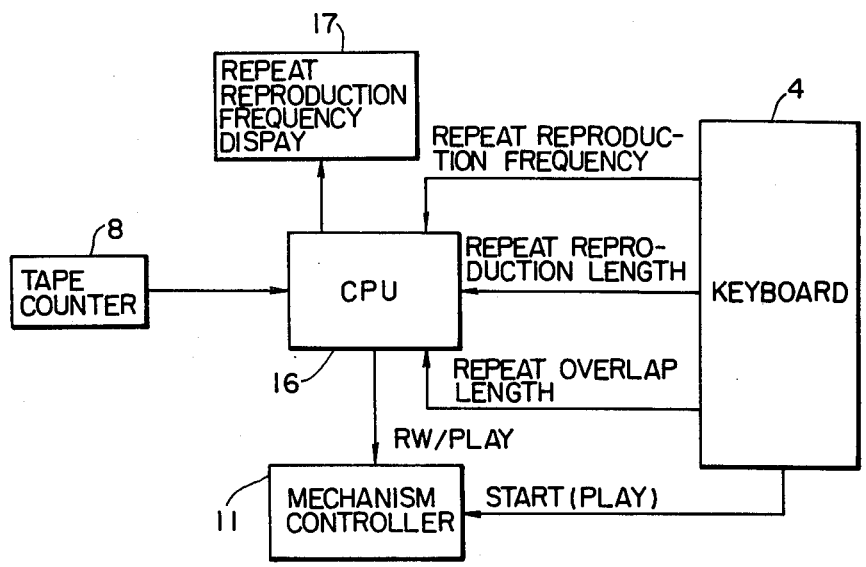
FIG. 3 is a block diagram illustrating another embodiment of the invention.

FIG. 3 is a block diagram showing another embodiment of the invention. In FIG. 3, those parts which have been described with reference to FIG. 1 are accordingly similarly numbered. This embodiment employs a microprocessor such as a microcomputer. Typically a CPU (central processing unit) 16 is employed as the microprocessor. The CPU 16 performs the functions of all of the memory devices 1, 2 and 3, switch 5, switch controller 14, coincidence detector, subtractor 7, gates 10 and 15, counter 12 and signal generator 13 described with reference FIG. 1. That is, the CPU 16 successively and repeatedly carries out the operations shown in FIG. 2.

Figure 4:
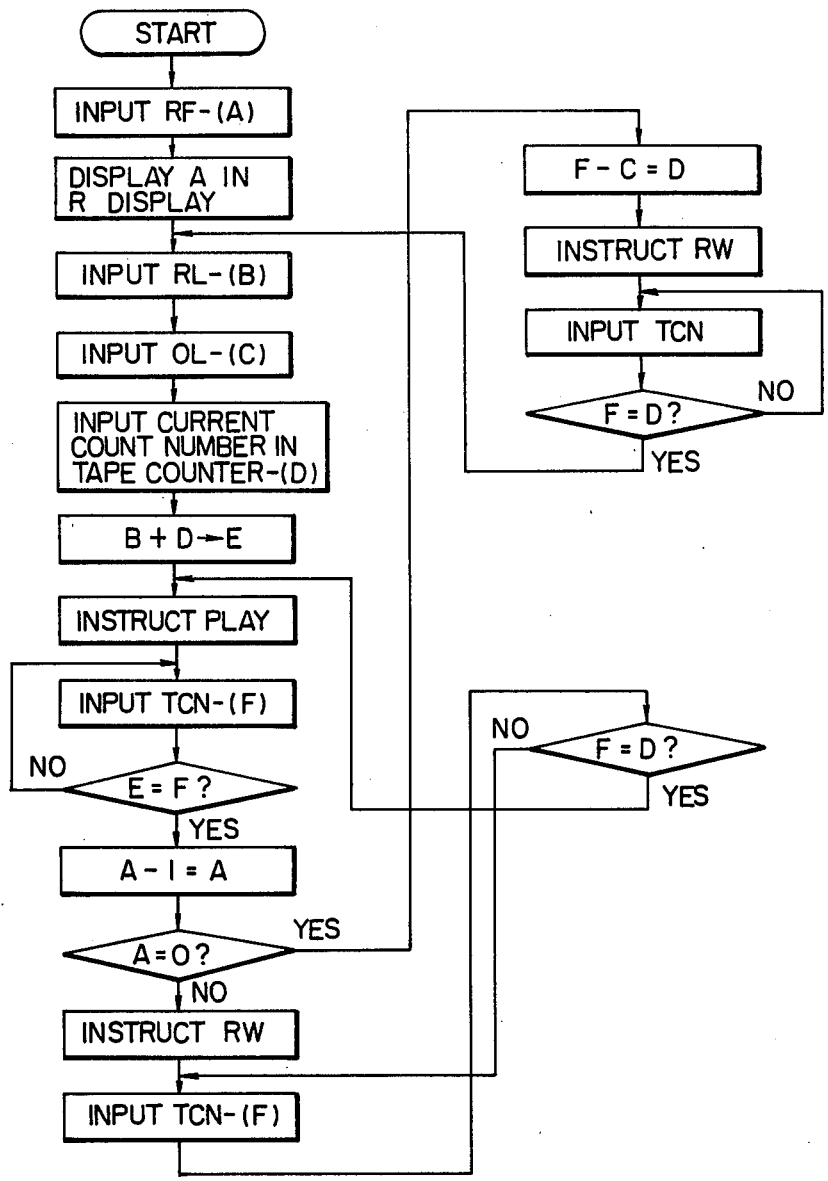
FIG. 4 is a flow chart describing the operation of the circuitry in FIG. 3.

FIG. 4 is a flow chart for describing the operation of the circuitry shown in FIG. 3. It will be understood that the object of the invention is achieved by performing the operations according to the sequence shown in FIG. 3.

As is apparent from the above description, according to the invention, it is unnecessary to provide a silent band on the magnetic tape, and one may freely select the repeat frequency, the repeated length, and the repeat overlap length. Therefore, the invention is quite suitable for tape recorders for use in the study of language, or dictation. Furthermore, as the successive repeated reproduced parts are partly overlapped by each other, the connection of the recorded contents can be clearly detected, which is convenient in operation.

While the invention has been described with reference to the above embodiments, it will be particularly understood that the invention is not limited thereto or thereby; and that various changes and modifications can be made therein by those of skill in the art without departing from the invention.

What is claimed is:

1. A repeat reproduction control system for a tape recorder, comprising;
   tape counter means;
   reproduction length memory means for storing a signal corresponding to the length of a recorded part of a magnetic tape, which part should be repeatedly reproduced;
   repeat frequency memory means for storing a signal corresponding to a number of reproduction repetitions;
   overlap length memory means for storing a signal corresponding to a length of a recorded part of said magnetic tape, which part is reproduced with a first repeatedly reproduced recorded part of said magnetic tape and also with a second repeatedly reproduced recorded part in succession with the first recorded part, such that said parts overlap each other;
   means for repeatedly reproducing said part to be repeatedly reproduced, using an output of said tape counter means and an output of said reproduction length memory means in response to a repeat reproduction instruction signal.

2. A repeat reproduction control system as claimed in claim 1, wherein said means for repeatedly reproducing includes coincidence detection means selectively receiving an output of either said overlap length memory means or said reproduction length memory means.

3. A repeat reproduction control system as claimed in claim 2, and further comprising subtractor means receiving said output of said tape counter, the output of said subtractor being supplied as a second input of said coincidence detector.

4. A repeat reproduction control system as claimed in claim 3, including further memory means actuated by at least an output of said coincidence detector for storing said output of said tape counter, and for supplying said stored output to said subtractor.

5. A repeat reproduction control system as claimed in claims 2 or 4, including down counter means for setting a value in correspondence to a value stored in said repeat frequency memory means, and for counting down from said set value in response to a coincidence output from said coincidence detector.

6. A repeat reproduction control system as claimed in claim 5, further comprising switch means for selectively supplying outputs of said overlap length memory means and said reproduction length memory means to said coincidence detection means, and controller means for controlling said switch, wherein, when the value in said down counter reaches zero, said down counter controls said controller means to set said switch such that the output of said overlap length memory means is supplied to said coincidence detecting means.

7. A repeat reproduction control system as claimed in claim 2, further comprising mechanism controller means for controlling rewind and playback functions of said tape recorder in response to outputs of said coincidence detection means.

8. A repeat reproduction control system as claimed in claim 6, wherein, when said number of repetitions coincides with said value stored in said repeat frequency memory means, said output of said overlap length memory means is applied to said coincidence detection means via said switch means, whereby said magnetic tape is rewound by as much as said overlap length.

9. A repeat reproduction control system as claimed in claim 7, wherein, after said rewinding, said coincidence detecting means outputs a coincidence signal, said down counter setting said corresponding value in response to said signal, and operating said switch controller means to control said switch means to apply said output of said reproduction length memory means to said coincidence detection means.

10. A repeat reproduction control system as claimed in claim 1, wherein said means for repeatedly reproducing, said reproduction length memory means, said overlap length memory means and said repeat frequency memory means are comprised by microprocessor means.

11. A repeat reproduction control system as claimed in claim 9, further comprising mechanism controller means operating in response to said microprocessor means for controlling at least rewind and playback modes of said tape recorder.

* * * * *